(12) United States Patent
Takamatsu et al.

(10) Patent No.: US 7,152,885 B2
(45) Date of Patent: Dec. 26, 2006

(54) CONNECTION STRUCTURE OF MULTI-CHANNEL TUBE WITH BRANCHING TUBE AND CONNECTION METHOD THEREFOR

(75) Inventors: Yoshikazu Takamatsu, Nakano-ku (JP); Hiromi Takasaki, Nakano-ku (JP); Susumu Satou, Ashikaga (JP)

(73) Assignee: Calsonic Kansei Corporation, Tokyo (JP)

( * ) Notice: Subject to any disclaimer, the term of this patent is extended or adjusted under 35 U.S.C. 154(b) by 178 days.

(21) Appl. No.: 11/019,662

(22) Filed: Dec. 23, 2004

(65) Prior Publication Data
US 2005/0161943 A1    Jul. 28, 2005

(51) Int. Cl.
*F16L 39/00* (2006.01)

(52) U.S. Cl. ............................. 285/124.1; 285/131.1; 29/890.14

(58) Field of Classification Search ............. 285/131.1, 285/288.1, 132.1, 124.1, 124.2, 288.11, 289.5; 29/890.14, 890.148, 890.149, 33 D
See application file for complete search history.

(56) References Cited

U.S. PATENT DOCUMENTS

| 1,984,242 A | * | 12/1934 | Trainer et al. ........... 285/131.1 |
| 5,150,926 A | * | 9/1992 | Egli ........................... 285/110 |
| 5,372,388 A | * | 12/1994 | Gargiulo ...................... 285/24 |
| 6,027,146 A | * | 2/2000 | Kurimoto ................. 285/131.1 |

FOREIGN PATENT DOCUMENTS

| JP | 64-6465 Y2 | 2/1989 |
| JP | 10-009716 A | 1/1998 |

OTHER PUBLICATIONS

U.S. Appl. No. 11/019,663, filed Dec. 23, 2004, Takamatsu et al.

* cited by examiner

*Primary Examiner*—David Bochna
(74) *Attorney, Agent, or Firm*—Foley & Lardner LLP

(57) ABSTRACT

A connection structure of a multi-channel tube with branching tubes is provided with a multi-channel tube having an end, the multi-channel tube including; an outer tube; a partition being formed in a unitary body and running parallel with the outer tube, the partition partitioning an interior of the outer tube into two or more channel holes; and a passage formed at an end of the partition, the passage linking the channel holes; two or more branching tubes respectively inserted into the channel holes to an insertion depth greater than a depth of the passage measured from the end of the multi-channel tube; and brazing material spreading beyond the passage over clearances between the multi-channel tube and the branching tubes and connecting the multi-channel tube and the branching tubes.

7 Claims, 15 Drawing Sheets

CONNECTION STRUCTURE OF MULTI-CHANNEL TUBE WITH BRANCHING TUBE AND CONNECTION METHOD THEREFOR

This application claims priority of Japanese Patent Application 2003-435299, filed Dec. 26, 2003. The entire contents of the aforementioned application is incorporated herein by reference.

BACKGROUND OF THE INVENTION

1. Field of the Invention

The present invention relates to a connection structure of a multi-channel tube with branching tubes and a connection method therefor.

2. Description of the Related Art

A machine is often equipped with tubes for various purposes. Such tubes are laid in various patterns and are often branched, merged or laid in parallel with each other depending on the case. For example, an air conditioner for a vehicle is provided with a front-seat heater and a rear-seat heater. The heaters are connected in parallel with an engine cooler via water circulation tubes, through which cooling water heated by the engine circulates. In such case, in view of saving a space and preventing heat-loss, most of the paths of the water circulation tubes are desired to be merged or laid in parallel.

Japanese Utility Model Patent Examined Publication No. 64-006465 discloses a related art for connecting a pair of single-hole tubes with a thicker single-hole tube by welding or brazing. The art can be applied for branching a tube into two tubes or merging two tubes into a tube.

SUMMARY OF THE INVENTION

In certain cases, a need for employing a multi-channel tube may arise, which is provided with partitions therein so that plural flows may pass therethrough. The aforementioned related art cannot be applied to connection among the multi-channel tube and tubes because the partitions obstruct brazing material percolating to adjacent contact area.

The present invention is intended for providing a connection structure and a connection method preferably applied to connection of a multi-channel tube with branching tubes.

According to a first aspect of the present invention, a connection structure of a multi-channel tube with branching tubes is provided with a multi-channel tube having an end, which includes an outer tube, a partition being formed in a unitary body and running parallel with the outer tube, the partition partitioning an interior of the outer tube into two or more channel holes and a passage formed at an end of the partition, which links the channel holes; two or more branching tubes respectively inserted into the channel holes to an insertion depth greater than a depth of the passage measured from the end of the multi-channel tube; and brazing material spreading beyond the passage over clearances between the multi-channel tube and the branching tubes and connecting the multi-channel tube and the branching tubes.

Preferably, in the connection structure, the passage is one or more cuts formed by- cutting boundaries between the partition and the outer tube.

More preferably, in the connection structure, the passage comprises a cut-off end receded from the end of the multi-channel tube.

Still preferably, in the connection structure, the end of the multi-channel tube is flared to form a flare portion.

According to a second aspect of the present invention, a connection method for connection of a multi-channel tube with branching tubes, the multi-channel tube having an outer tube and a partition formed in a unitary body and running parallel with the outer tube, the partition partitioning an interior of the outer tube into two or more channel holes, is provided with forming a passage at an end of the partition so as to link the channel holes; flaring a portion of the outer tube, the portion being separated from the partition by the passage; inserting the branching tubes respectively into the channel holes to an insertion depth greater than a depth of the passage measured from the end of the multi-channel tube; and brazing the multi-channel tube and the branching tubes.

Preferably, in the connection method the forming step further comprises cutting boundaries between the partition and the outer tube.

More preferably, in the connection method, the forming step further comprises cutting off the end of the partition so as to be receded from the end of the multi-channel tube.

DETAILED DESCRIPTION OF THE PREFERRED EMBODIMENT

A first embodiment of the present invention will be described hereinafter with reference to FIGS. 1 through 7.

Figure 1:
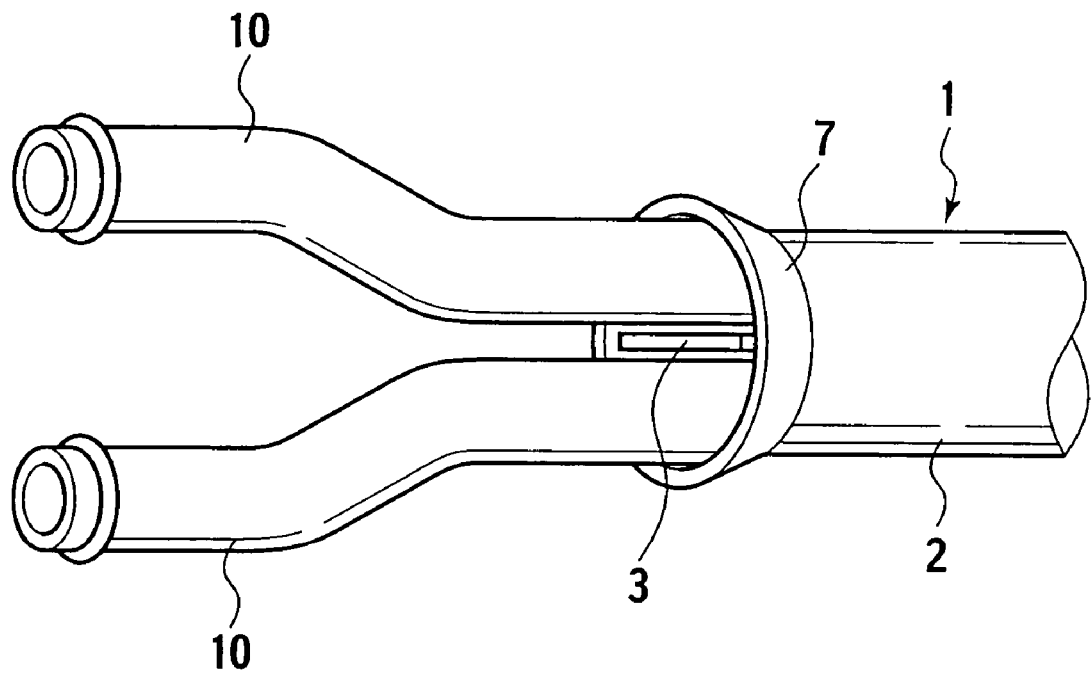
FIG. 1 is an oblique perspective view of a multi-channel tube connected with a pair of branching tubes according to a first embodiment of the present invention.
Figure 2:
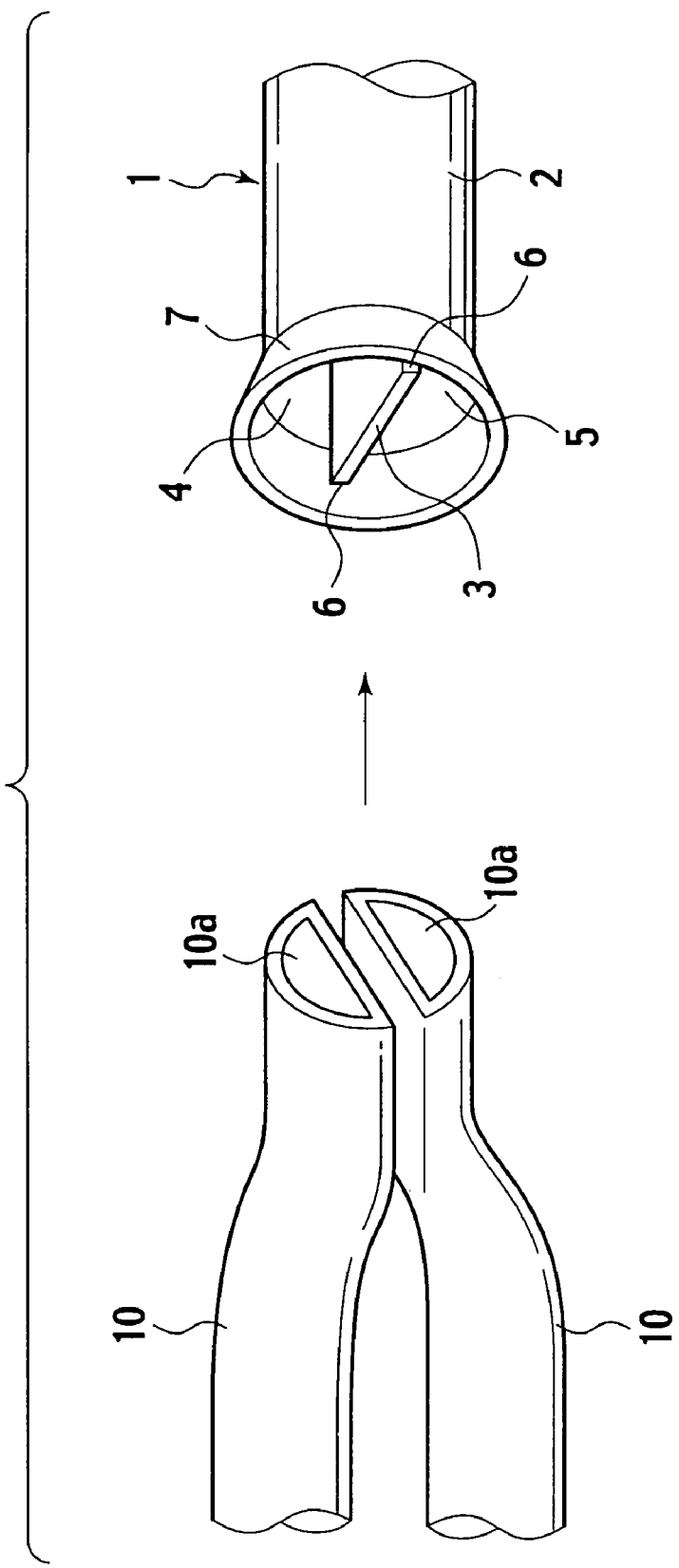
FIG. 2 is an exploded oblique perspective view of the multi-channel tube and the branching tubes according to the first embodiment of the present invention.
Figure 3:
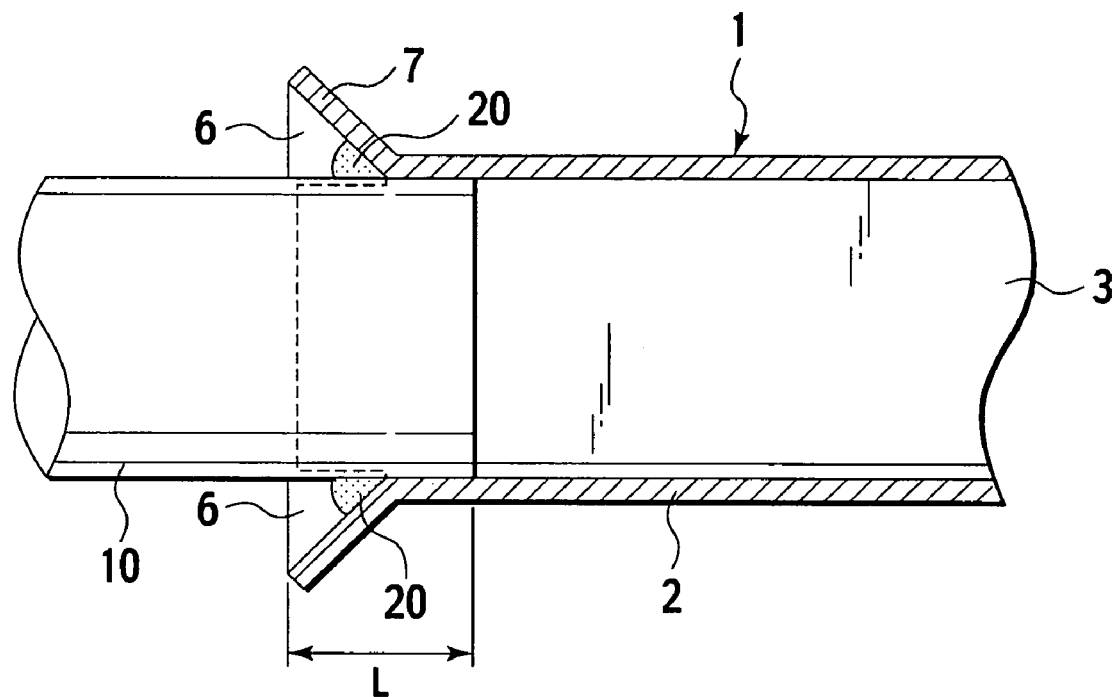
FIG. 3 is a cross sectional view of the multi-channel tube connected with the branching tubes according to the first embodiment of the present invention.

A multi-channel tube 1 is provided with an outer tube 2 and a partition 3 formed in a unitary body with the outer tube 2 as shown in FIG. 1 through 3. The partition 3 runs parallel to the outer tube 2 and partitions the interior of the outer tube 2 into a pair of channel holes 4 and 5 respectively having half-cylindrical inner spaces. An end of the multi-channel tube 1 is flared to be a flare portion 7. Cuts 6 as passages between the channel holes 4 and 5 are formed at the end of the multi-channel tube 1 and at boundaries between the partition 3 and the outer tube 2 so as to separate the partition 3 from an inner surface of the flare portion 7.

Each of branching tubes 10 is formed in a cylindrical tubular shape and has a channel hole 1a therein. An end thereof is formed in a half-cylindrical shape, an outer surface of which substantially fits any of the channel holes 4 and 5.

The branching tubes 10 are respectively inserted into the channel holes 4 and 5 as shown in FIG. 2. The branching tubes 10 are connected with each other at brazing portions.

Figure 4:
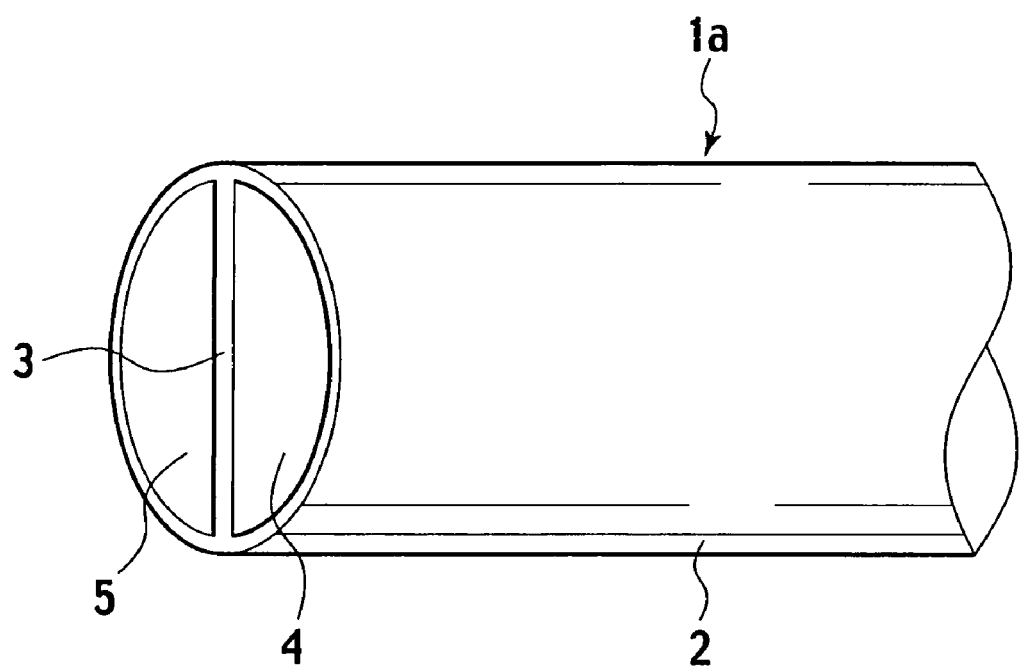
FIG. 4 is an oblique perspective view of the multi-channel tube according to the first embodiment of the present invention in a state before machining.

Connection process of the multi-channel tube 1 with the branching tubes 10 will be described with reference to FIGS. 4 through 7. As shown in FIG. 4, before machining, a multi-channel tube 1a is formed in a straight tubular shape having the partition 3 and the paired channel holes 4 and 5. The multi-channel tube 1a can be preferably made of aluminum by an extrusion forming.

The end of the multi-channel tube 1a is machined by means of a clamp member 12 and a punching rod 13. Constitutions of the clamp member 12 and the punching rod 13 will be described hereinafter with reference to FIGS. 5 through 7.

The clamp member 12 has a support hole 12a for supporting the multi-channel tube 1a and a conical surface 12b around the support hole 12a so as to receive the punching rod 13. The conical surface 12b forms an angle α, for example 45 degree, with an inner surface of the support hole 12a. The punching rod 13 is provided with a conical end 13b forming an angle b, for example 45 degree, with an outer surface thereof, which substantially corresponds with the conical surface 12b of the clamp member 12. The conical end 13b has a tip ring portion 13a at an end tip thereof. A diameter of the tip ring portion 13a is substantially equal to an inner diameter of the multi-channel tube 1a.

Machining of the end of the multi-channel tube 1a is processed with the aforementioned clamp member 12 and punching rod 13 as described below.

Figure 5:
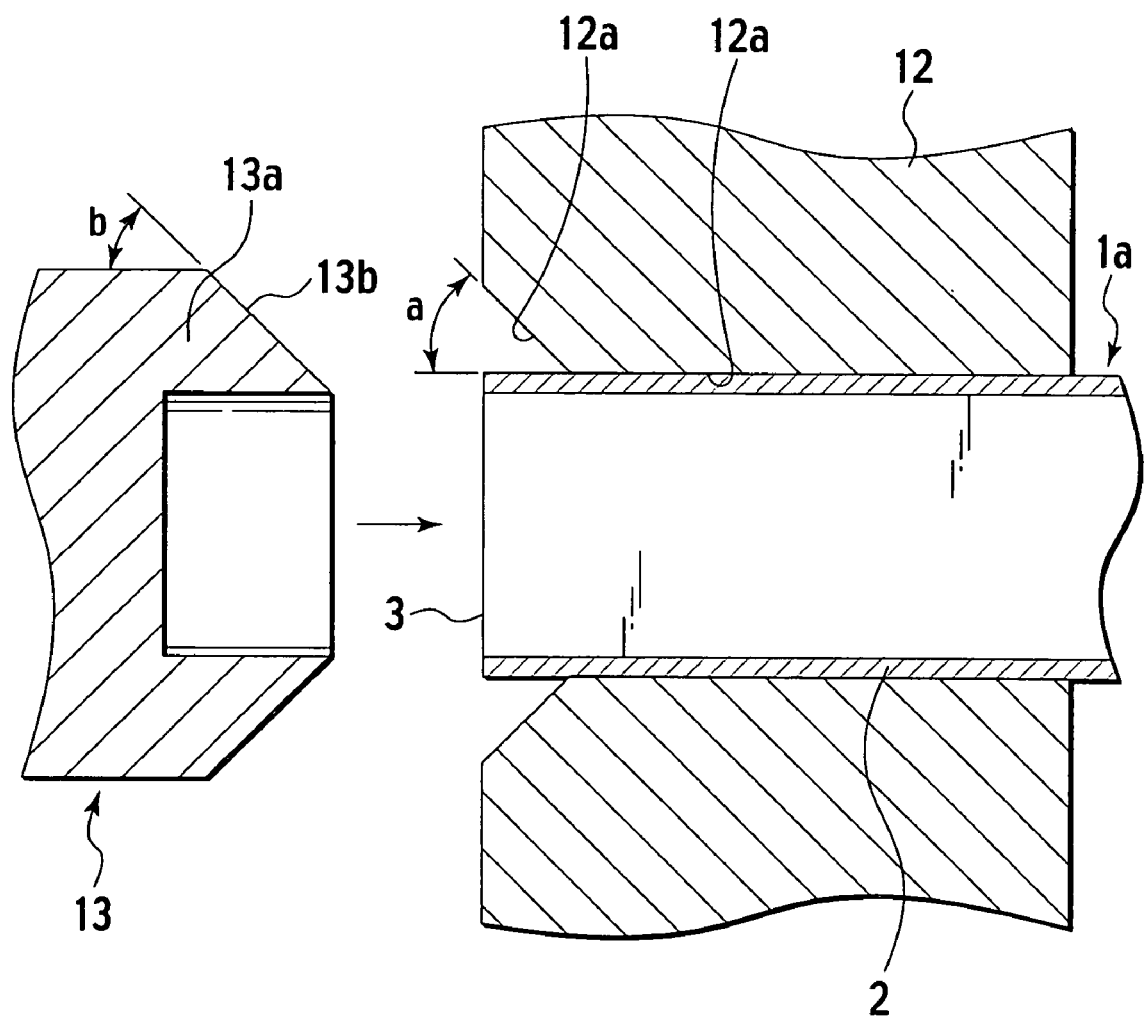
FIG. 5 is a cross sectional view of the multi-channel tube illustrating a machining process with respect to an end portion thereof according to the first embodiment of the present invention.
Figure 6:
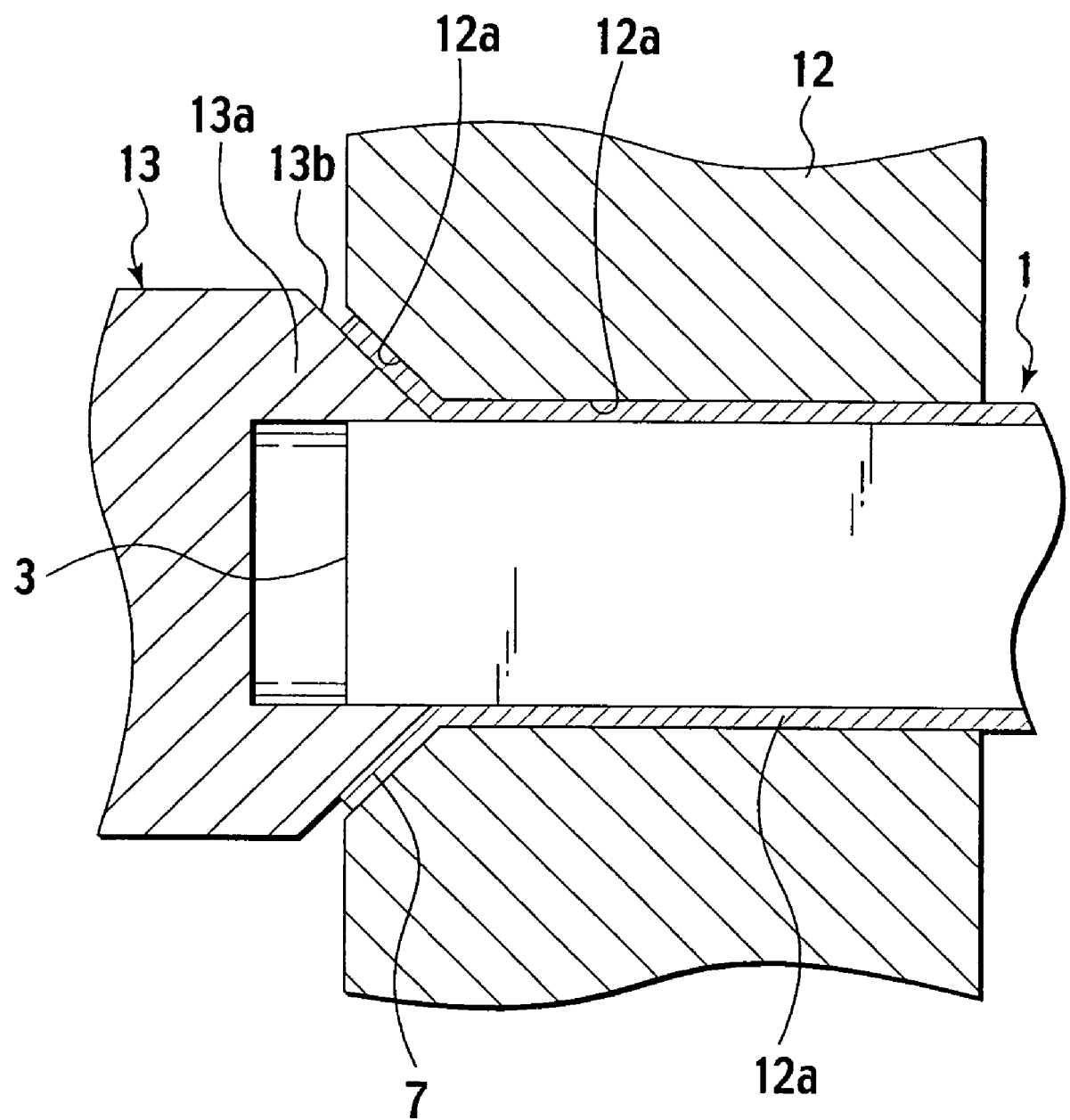
FIG. 6 is a cross sectional view of the multi-channel tube illustrating the machining process according to the first embodiment of the present invention after the state shown in FIG. 5.
Figure 7:
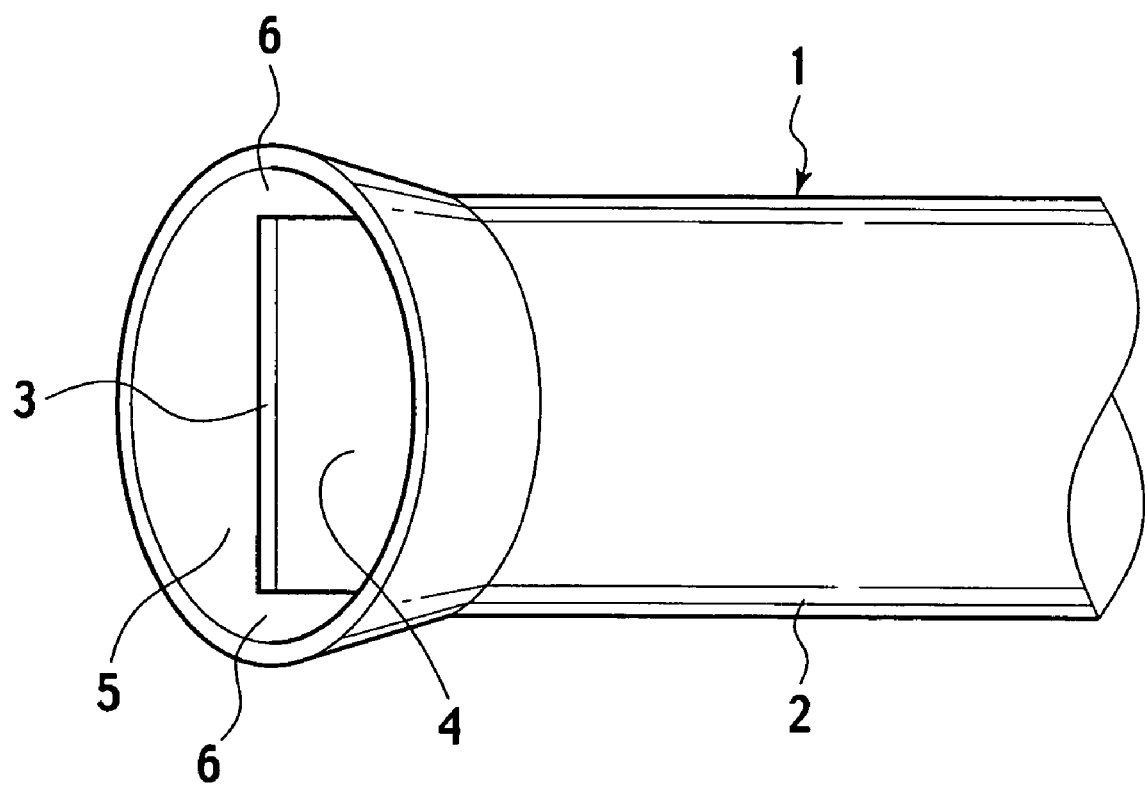
FIG. 7 is an oblique perspective view of the multi-channel tube illustrating a state after the machining process according to the first embodiment of the present invention.
Figure 8:
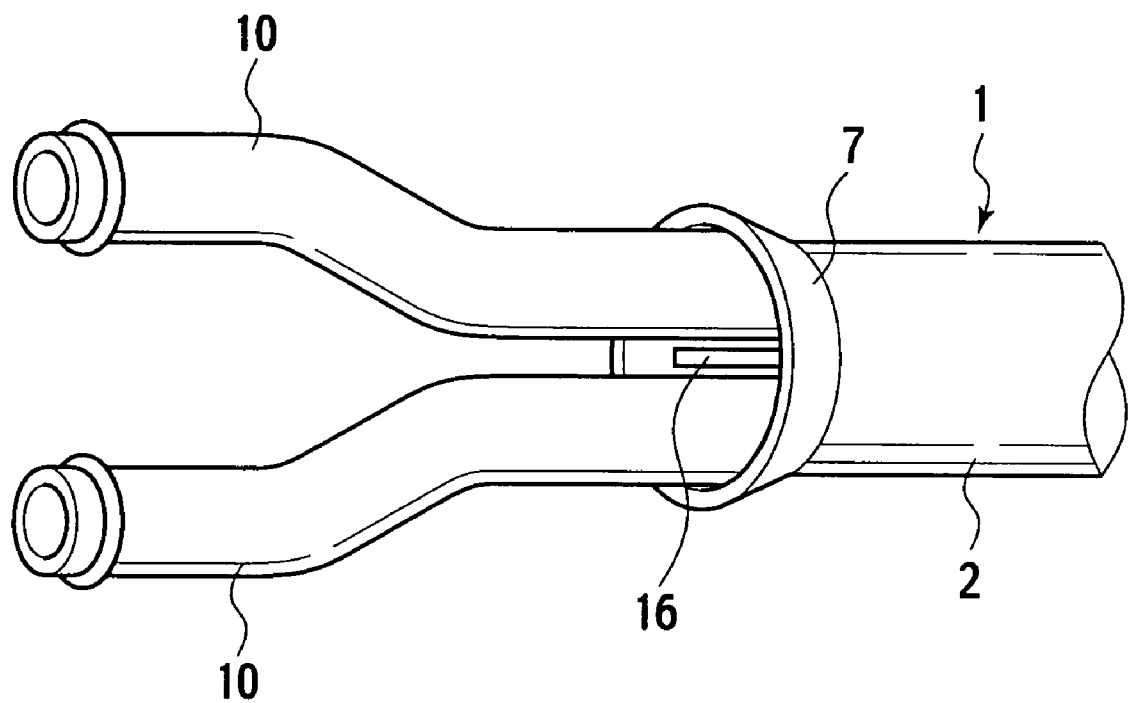
FIG. 8 is an oblique perspective view of a multi-channel tube connected with a pair of branching tubes according to a second embodiment of the present invention.

The end of the multi-channel tube 1a is supported in the support hole 12a of the clamp member 12 as shown in FIG. 5. Next, the punching rod 13 is inserted into the support hole 12a. In the course of insertion, the tip ring portion 13a abuts and cuts the end of the partition 3 at borders between the partition 3 and the outer tube 2 as shown in FIG. 6, thereby the cuts 6 are formed. Further, the conical end 13b presses and deforms the outer tube 2 separated from the partition 3 outward. Then, the conical surface 13b restricts widening of the outer tube 2 and hence the widened portion of the outer tube 2 takes a form of the flare portion 7.

Next, the branching tubes 10 are respectively inserted into the channel holes 4 and 5. Then, the ends of the branching tubes 10 should be inserted more deeply than bottoms of the cuts 6. More specifically, an insertion depth L of the branching tubes 10, which is defined as a depth measured from the end of the multi-channel tube 10 to the end of the inserted branching tubes 10, is greater than the depth of the cuts 6, as shown in FIG. 3.

Next, a piece of brazing material is placed between the multi-channel tube 1 and the branching tubes 10, like as a ring along the inner surface of the flare portion 7. Since the flare portion 7 is separated from the partition 3 by the cuts 6, placing the piece of brazing material is not obstructed.

Next, the multi-channel tube 1 and the branching tubes 10 are heated so as to fuse the brazing material, and then cooled. When the brazing material is solidified, the brazing material is to be a brazing portion 20 and thereby the multi-channel tube 1 and the branching tubes 10 are connected.

According to the aforementioned connection process, the fused brazing material easily percolates to the adjacent channel holes 4 and 5 beyond the partition 3 and spreads over clearances between an outer circumference of the branching tubes 10 and the inner surface of the flare portion 7 without obstruction. Therefore, the brazing and connection process can be easily accomplished and connection between the multi-channel tube 1 and the branching tubes 10 are assured with such an easy process.

According to the first embodiment of the present invention, a space between the flare portion 7 and the branching tubes 10, which has a substantially triangular cross-section, receives the fused brazing material and prevents it from escaping out of the multi-channel tube 1 and the branching tubes 10.

A second embodiment of the present invention will be described hereinafter with reference to FIGS. 8 through 15. In the following description, substantially the same elements as the aforementioned first embodiment are referenced with the same numerals and the detailed descriptions are omitted.

Figure 12A:
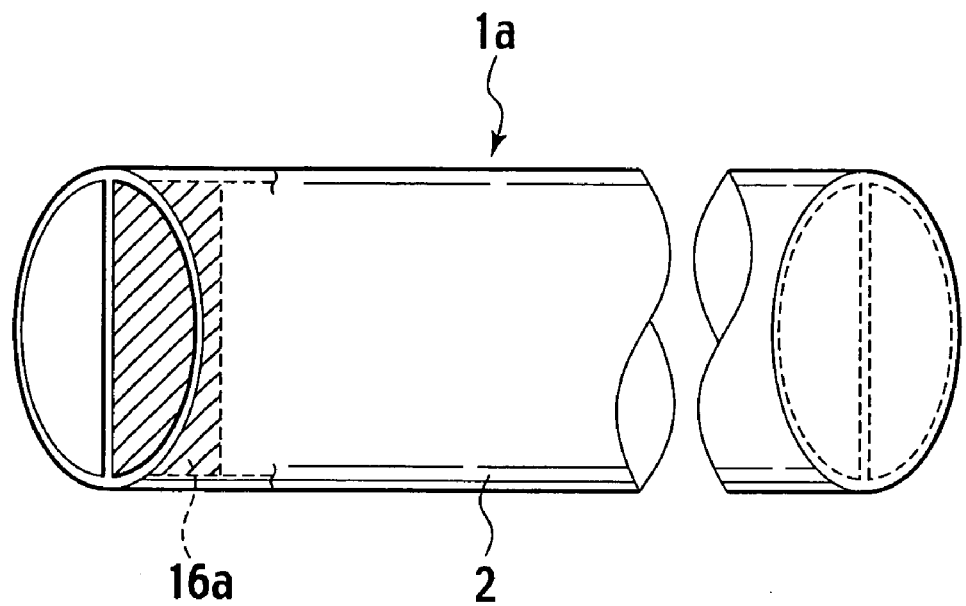
FIG. 12A is an oblique perspective view of the multi-channel tube according to the second embodiment of the present invention in a state before machining.
Figure 12B:
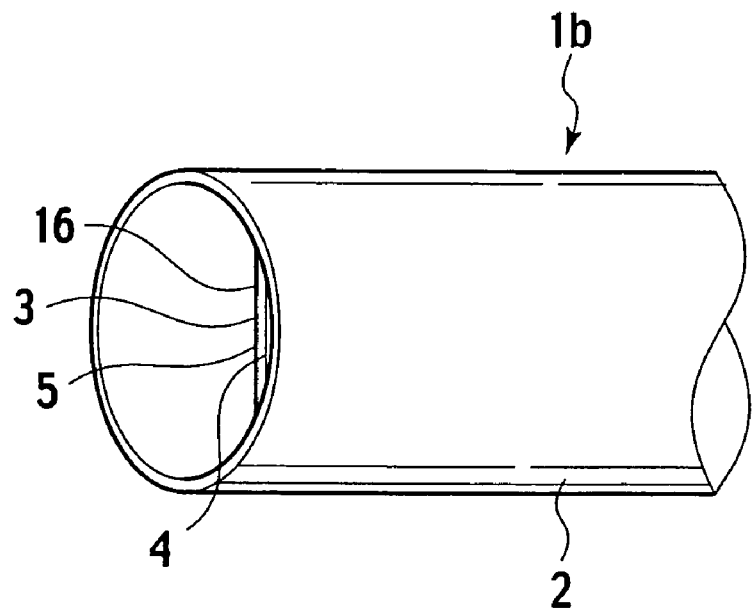
FIG. 12B is an oblique perspective view of the multi-channel tube according to the second embodiment of the present invention in a state after machining.

A multi-channel tube 1 according to the second embodiment of the present invention is provided with an outer tube 2 and a partition 3 formed in a unitary body with the outer tube 2. The multi-channel tube 1 is made from the multi-channel tube 1a formed in a straight tubular shape and preferably made of aluminum by an extrusion forming, similarly to the aforementioned second embodiment. An end of the partition 3 is cut off to form a cut-off end 16 after a machining process, which will be described later, as shown in FIGS. 12A and 12B. FIGS. 12A and 12B show that a rectangular portion of the partition 3 is cut off, however, the shape of the cut-off portion is not limited to such a rectangular shape. Thereby, the cut-off end 16 recedes from the end of the multi-channel tube 1 to form a passage between the channel holes 4 and 5 and a depth of the cut-off end 16 measured from the end of the multi-channel tube 1 is, for example, substantially identical to a length of the flare portion 7.

Figure 13:
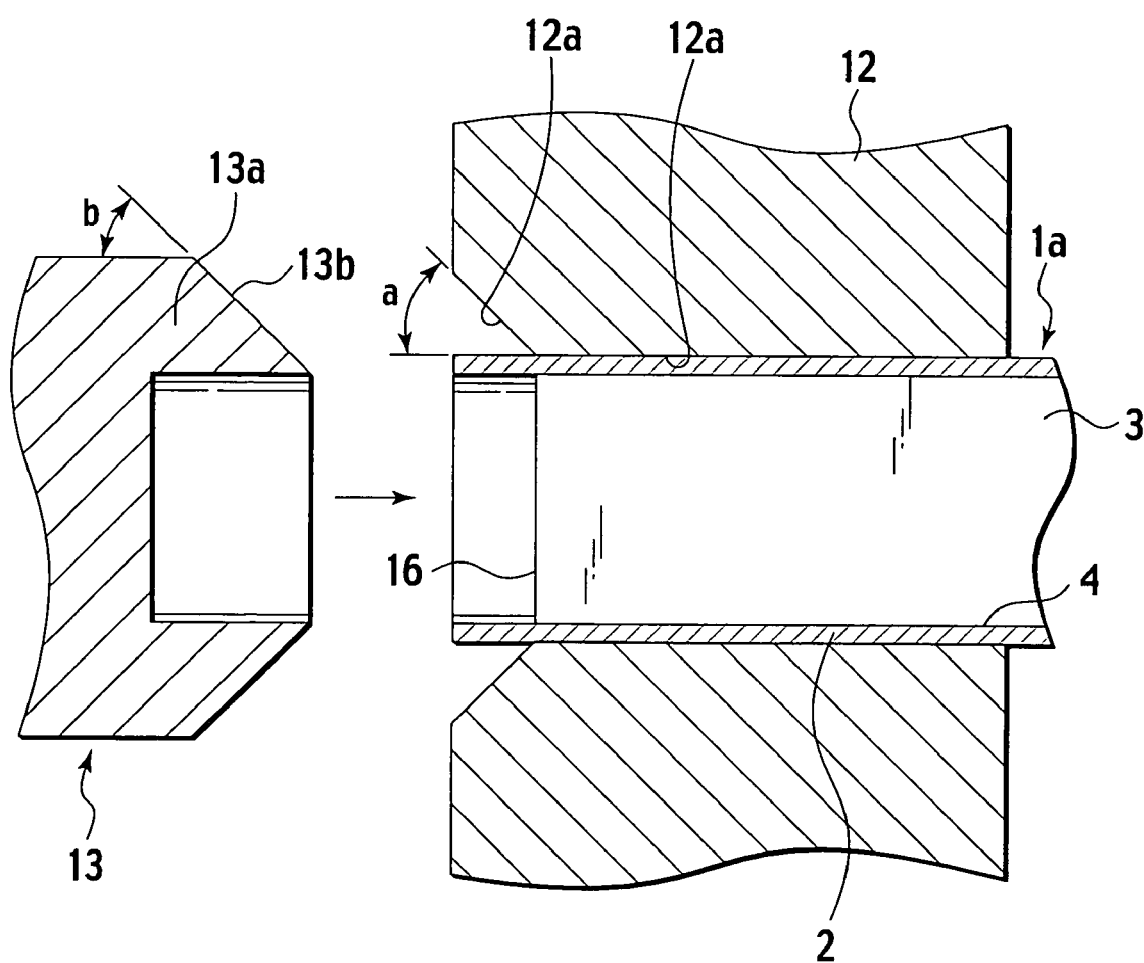
FIG. 13 is a cross sectional view of the multi-channel tube illustrating a machining process with respect to an end portion thereof according to the second embodiment of the present invention.
Figure 14:
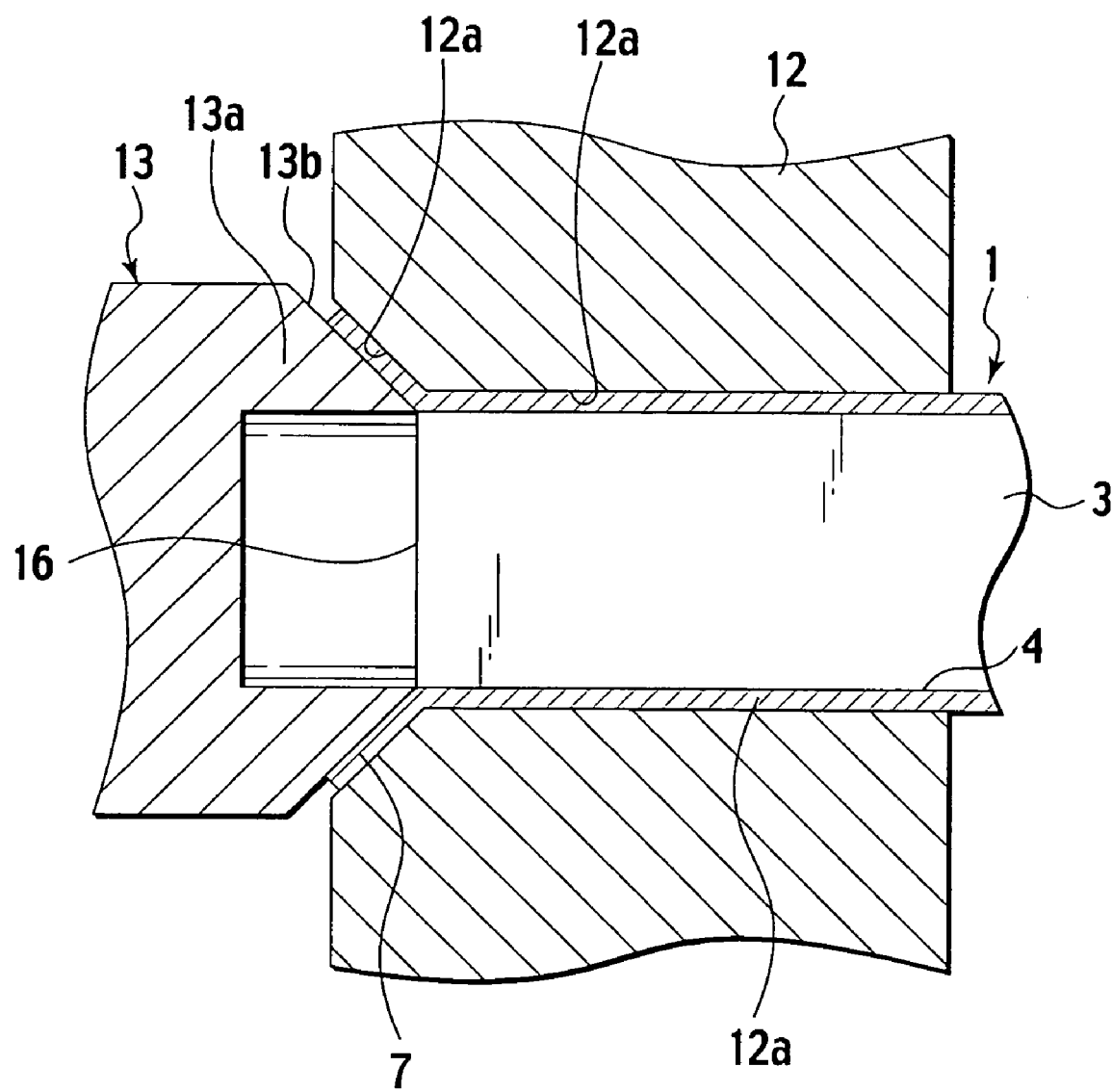
FIG. 14 is a cross sectional view of the multi-channel tube illustrating the machining process according to the second embodiment of the present invention after the state shown in FIG. 13.
Figure 15:
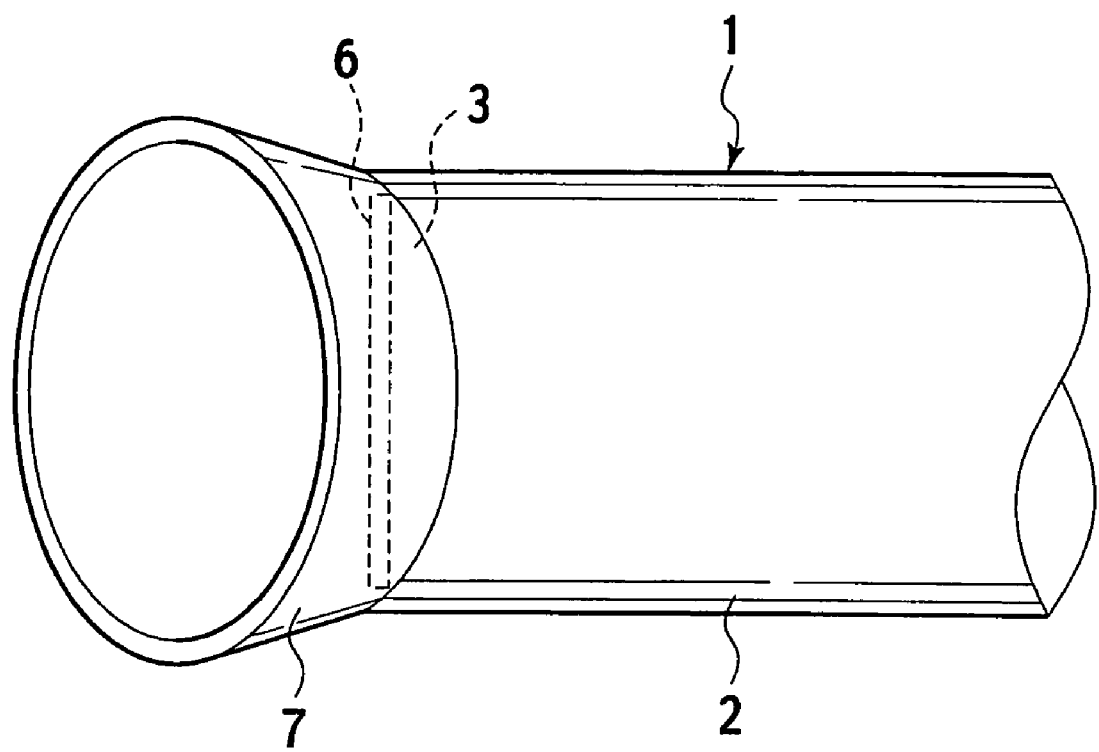
FIG. 15 is an oblique perspective view of the multi-channel tube illustrating a state after the machining process according to the second embodiment of the present invention.

An end portion of the multi-channel tube 1 is separated from the partition 3 since the corresponding portion of the partition 3 is cut off. The end portion of the multi-channel tube 1 is flared to be a flare portion 7 by using the clamp member 12 and the punching rod 13 as shown in FIGS. 13 and 14. The constitutions of the clamp member 12 and the punching rod 13 and the machining process of the end of the multi-channel tube 1a are substantially identical to the aforementioned first embodiment.

Figure 9:
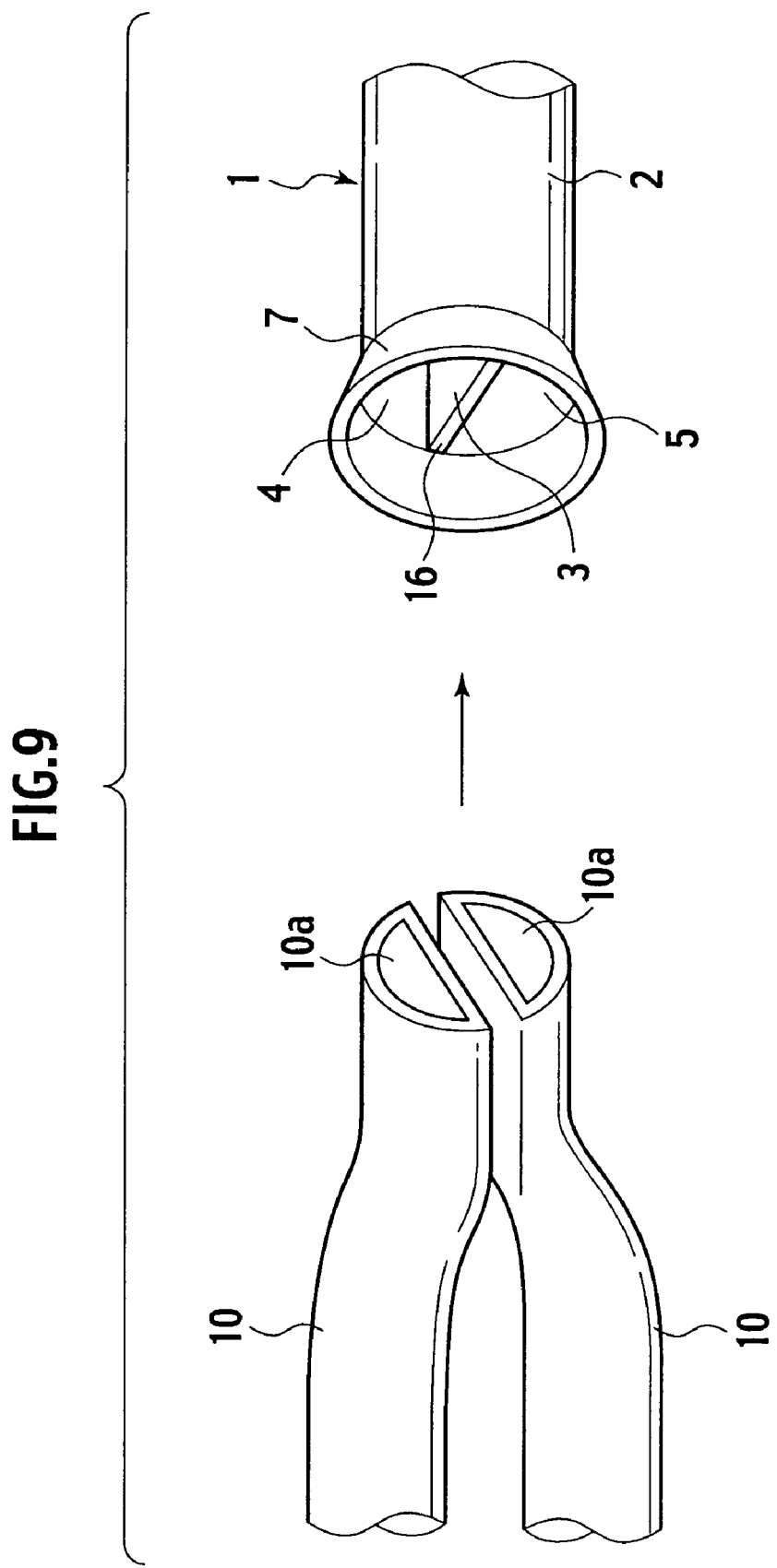
FIG. 9 is an exploded oblique perspective view of the multi-channel tube and the branching tubes according to the second embodiment of the present invention.
Figure 10:
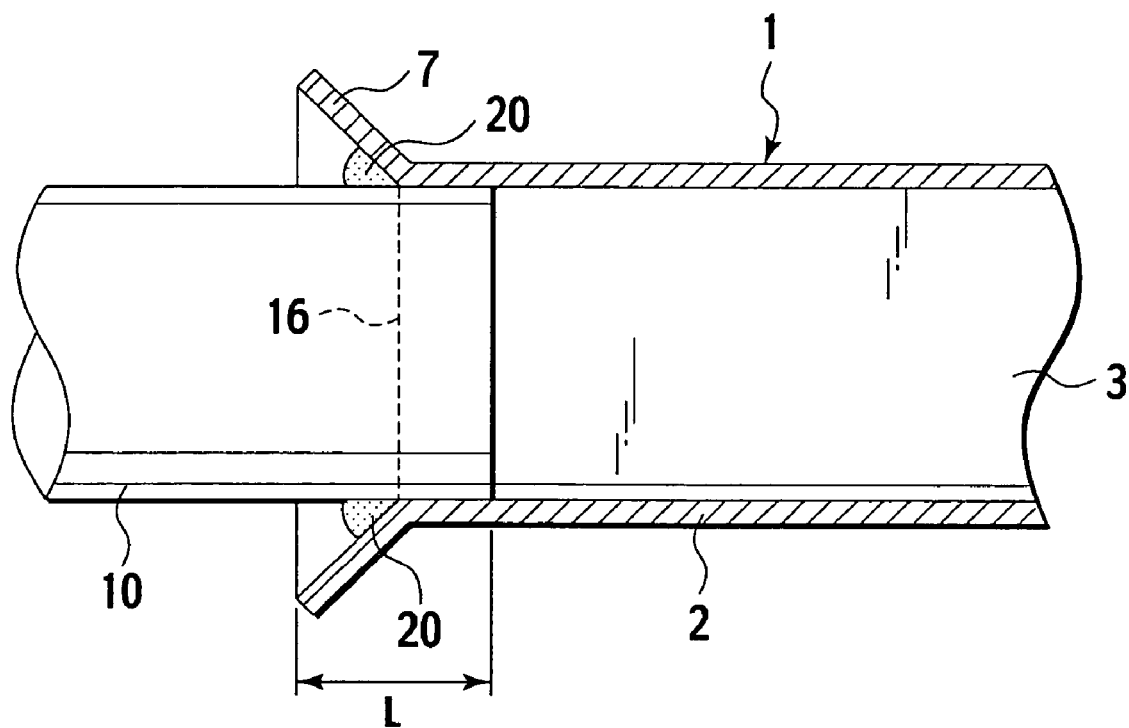
FIG. 10 is a cross sectional view of the multi-channel tube connected with the branching tubes according to the second embodiment of the present invention, section of which is taken from a plane parallel to a partition thereof.

The branching tubes 10 are respectively inserted into the channel holes 4 and 5 as shown in FIG. 9. Then, the ends of the branching tubes 10 should be inserted more deeply than the cut-off end 16. An insertion depth L of the branching tubes 10 is greater than the depth of the cut-off end 16, where the insertion depth L of the branching tubes 10 and the depth of the cut-off end 16 are commonly measured from the end of the multi-channel tube 1, as shown in FIG. 10.

Figure 11A:
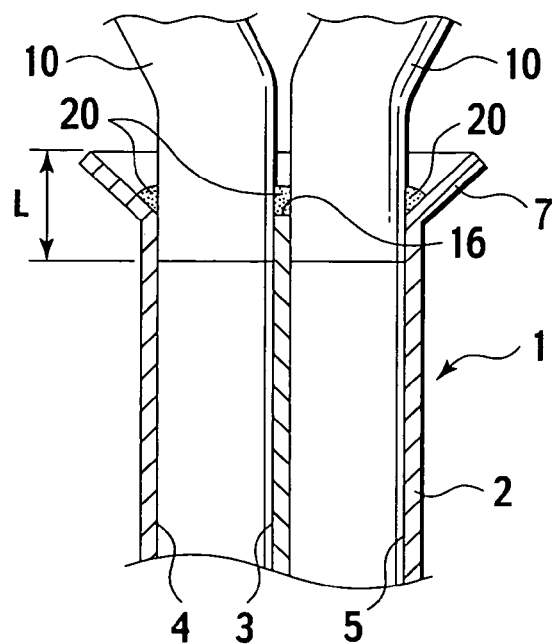
FIG. 11A is a cross sectional view of the multi-channel tube connected with the branching tubes according to the second embodiment of the present invention, section of which is taken from a plane perpendicular to the partition thereof.

Next, as shown in FIG. 11A, the multi-channel tube 1 is raised in an upright posture so that the multi-channel tube 1 is disposed below the branching tubes 10. Then, pieces of brazing material are placed between the branching tubes 10 and along an inner surface of the flare portion 7. For example, it is preferable that a bar-like piece of the brazing material is place between the branching tubes 10 and a ring-like piece of the brazing material is placed along the inner surface of the flare portion 7. Or, alternatively, any proper manner may be accomplished. Since the cut-off end 16 is receded substantially to a bottom of the flare portion 7, placing the pieces of brazing material is not obstructed.

Next, the multi-channel tube 1 and the branching tubes 10 are heated so as to fuse the brazing material, and then cooled. When the brazing material is solidified, the brazing material is to be a brazing portion 20 and thereby the multi-channel tube 1 and the brazing tubes 10 are connected.

According to the aforementioned connection process, the fused brazing material easily percolated to the adjacent channel holes 4 and 5 beyond the partition 3 and spreads over clearances between an outer circumference of the branching tubes 10 and the inner surface of the flare portion 7 without obstruction. Therefore, the brazing and connection process can be easily accomplished and connection between the multi-channel tube 1 and the branching tubes 10 are assured with such an easy process.

According to the second embodiment of the present invention, a space between the flare portion 7 and the branching tubes 10, which has a substantially triangular cross-section, receives the fused brazing material and prevents it from escaping out of the multi-channel tube 1 and the branching tubes 10.

Figure 11B:
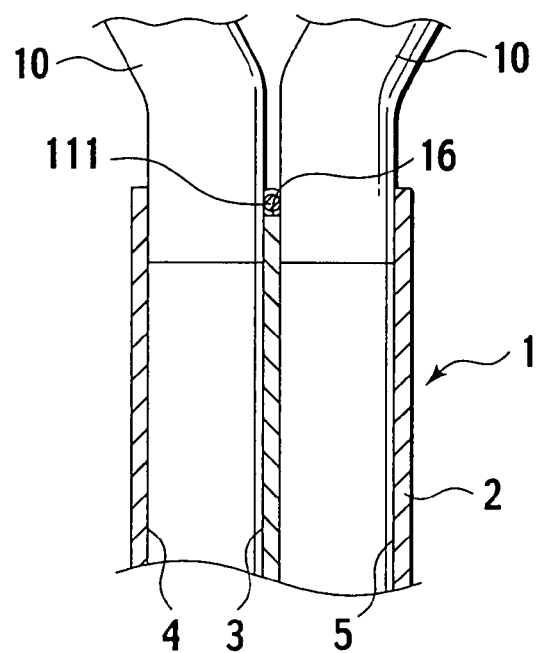
FIG. 11B is a cross sectional view of the multi-channel tube connected with the branching tubes according to a modification of the second embodiment of the present invention, section of which is taken from a plane perpendicular to the partition thereof.

The second embodiment can be properly modified, for example, as shown in FIG. 11B. According to the modification, the end of the multi-channel tube 1 is not flared and hence not provided with the flare portion 7. A bar-like piece 111 of the brazing material is place on the cut-off end 16 and then heating is accomplished. The bar-like piece 111 is fused and spreads around the outer circumference of the branching tubes 10 and along the inner surface of the multi-channel tube 1. Connection between the multi-channel tube 1 and the branching tubes 10 are assured with such an easy process.

The aforementioned description had been given with the first and second embodiments in which the multi-channel tube 1 has a pair of channel holes 4 and 5, however, any modification in which the multi-channel tube has three or more channel holes can be embodied.

According to the aforementioned description, the depth of the cut-off end 16 was substantially identical to the length of the flare portion 7, however, the present invention is not limited to the regulation. Any depth shorter than the insertion depth L of the branching tubes 10 may be properly selected. Moreover, the shape of the cut-off end 16 is not limited to be linear. Curved, slanted and any other shapes may be properly selected under a condition that the depth of the cut-off end 16 is not greater than the insertion depth L.

The present invention can be applied to various apparatuses. One of preferably applications is, for example, an air-conditioner for a vehicle, in which warm water from an engine radiator is supplied to a front-seat heater and a rear-seat heater in parallel through a multi-channel tube.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A connection structure of a multi-channel tube with branching tubes, the connection structure comprising:
    a multi-channel tube having an end, the multi-channel tube including;
        an outer tube;
        a partition being formed in a unitary body and running parallel with the outer tube, the partition partitioning an interior of the outer tube into two or more channel holes; and
        a passage formed at an end of the partition, the passage linking the channel holes;
    two or more branching tubes respectively inserted into the channel holes to an insertion depth greater than a depth of the passage measured from the end of the multi-channel tube; and
    brazing material spreading beyond the passage over clearances between the multi-channel tube and the branching tubes and connecting the multi-channel tube and the branching tubes.

2. The connection structure of claim 1, wherein the passage is one or more cuts formed by cutting boundaries between the partition and the outer tube.

3. The connection structure of claim 1, wherein the passage comprises a cut-off end receded from the end of the multi-channel tube.

4. The connection structure of claim 1, wherein the end of the multi-channel tube is flared to form a flare portion.

5. A connection method for connection of a multi-channel tube with branching tubes, the multi-channel tube having an outer tube and a partition formed in a unitary body and running parallel with the outer tube, the partition partitioning an interior of the outer tube into two or more channel holes, the connection method comprising:
    forming a passage at an end of the partition so as to link the channel holes;
    flaring a portion of the outer tube, the portion being separated from the partition by the passage;
    inserting the branching tubes respectively into the channel holes to an insertion depth greater than a depth of the passage measured from the end of the multi-channel tube; and
    brazing the multi-channel tube and the branching tubes.

6. The connection method of claim 5, wherein the forming step further comprises cutting boundaries between the partition and the outer tube.

7. The connection method of claim 5, wherein the forming step further comprises cutting off the end of the partition so as to be receded from the end of the multi-channel tube.

* * * * *